No. 847,088. PATENTED MAR. 12, 1907.
J. C. LINCOLN.
VARIABLE SPEED ELECTRIC MOTOR.
APPLICATION FILED JAN. 12, 1906.
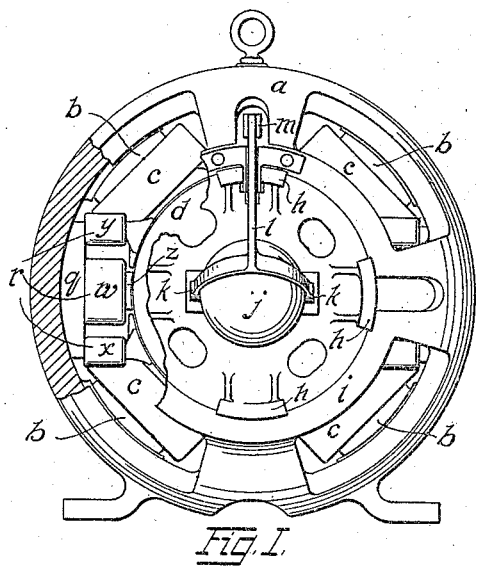
Fig. I.
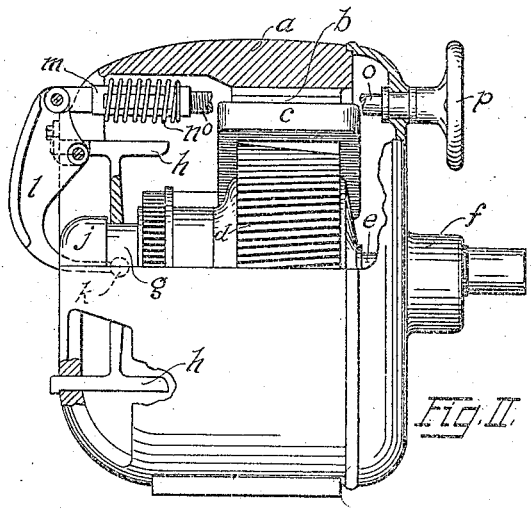
Fig. II.
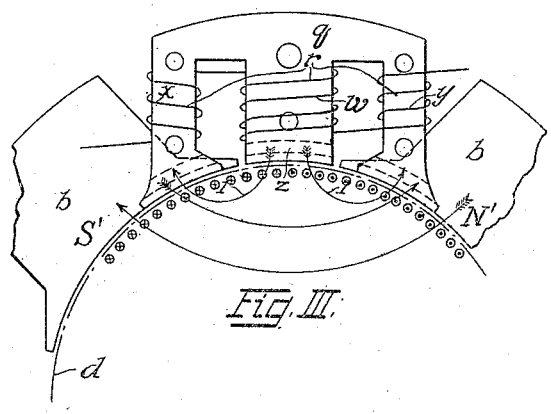
Fig. III.
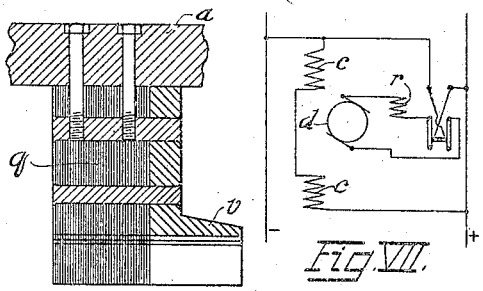
Fig. IV. Fig. VII.
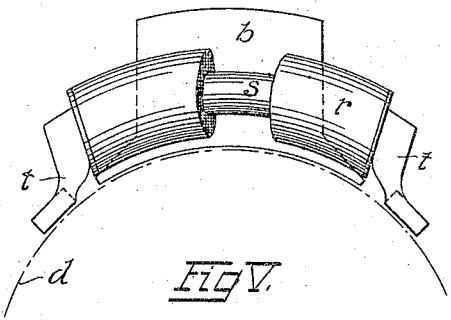
Fig. V.
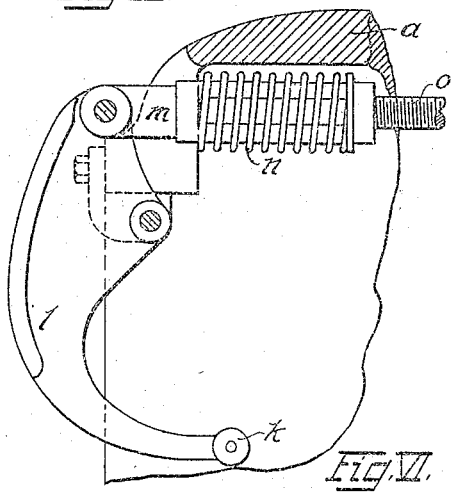
Fig. VI.
Witnesses:
F. C. Valentine
C. W. Hitchcock
Inventor.
John C. Lincoln

UNITED STATES PATENT OFFICE.

JOHN C. LINCOLN, OF EAST CLEVELAND, OHIO, ASSIGNOR TO THE LINCOLN COMPANY, OF CLEVELAND, OHIO, A CORPORATION OF OHIO.

VARIABLE-SPEED ELECTRIC MOTOR.

No. 847,088.     Specification of Letters Patent.     Patented March 12, 1907.

Application filed January 12, 1906. Serial No. 295,765.

*To all whom it may concern:*

Be it known that I, JOHN C. LINCOLN, a citizen of the United States of America, and a resident of East Cleveland, in the county of Cuyahoga and State of Ohio, have invented certain new and useful Improvements in Variable-Speed Electric Motors, of which the following is a specification, reference being had to the accompanying drawings, forming a part thereof.

My invention relates to improvements in variable-speed electric motors, being preferably applied to that type of motor having field and armature windings associated in shunt relation and provided with suitable means for securing the lateral or axial movement of the armature with respect to the field structure of the motor, whereby variation in speed is attained.

The object of my invention has been to so construct electric motors as to secure an unusual range in the speed variation thereof, meanwhile avoiding harmful sparking at the brushes of the motor, and particularly at high speeds. The said improvements in addition adapt the motor for operating equally well in either direction of rotation of the armature and admit of closely controlling the magnetic field for preventing sparking, which I have herein termed the "commutating-field."

Referring briefly to the illustrated motor embodying my invention, I may say that it consists of the usual field structure, within which the motor is designed normally to rotate. Associated with said armature are means for withdrawing it laterally from the field structure, said means comprising screw mechanism and a spring opposing the pull of the armature in association with a rocker-arm or lever acting upon the end of the armature-shaft to withdraw the armature from its normal position of rotation. The most important feature of my invention, however, resides in the means for affording a commutating-field during the high-speed positions of adjustment for the armature, comprising an electromagnet laterally positioned beyond the field structure of the motor adjacent to the armature when withdrawn therefrom to its high-speed positions, this electromagnet being connected in series with the armature of the motor. Preferably this electromagnet takes the form of a three-pole magnet, carrying the main exciting-coil upon an inner pole or leg thereof, while two coils oppositely wound are mounted upon the exterior poles and serve to prevent the usual drop in speed under heavy loads.

Further details of my invention and the structural features and operation of my improved motor will be made clear by referring to the accompanying sheet of drawings, wherein—

Figure I is an end elevation of an electric motor constructed in accordance with my invention. Fig. II is a side view of said motor, partially broken away and in section. Fig. III is a detail view of the preferred magnet structure with which is associated an explanatory diagram. Fig. IV is a central sectional view through the preferred magnet structure. Fig. V shows a modified type of electromagnet for obtaining the commutating-field. Fig. VI is a detail showing the preferred means for securing the axial adjustment of the armature, and Fig. VII diagrammatically shows the features of the shunt-wound motor, the commutating-magnet structure, and a reversing-switch for the motor.

Throughout the several figures of the drawings, I have employed the same character of reference to indicate similar parts.

Within the iron casting $a$ are shown the four poles $b$ of a shunt-wound motor, carrying their exciting-coils $c$. The armature $d$, wound in shunt relation therewith, preferably is frusto-conical in shape, as is the armature-space formed by the several pole-pieces of the field structure, although the more commonly-used types of armature and field structure may be used in practicing my invention. The armature-shaft $e$ is mounted to slide longitudinally in its bearing $f$ at one side of the motor, while the other bearing $g$ is carried by means of a spider or frame $h$, sliding within ways $i$, provided at the other side of the motor. An enlarged cap $j$ is formed upon the bearing $g$, with which rollers $k$, attached to the rocker-arm or lever $l$, are adapted to engage. The other end of said lever is pivotally secured a short distance from the fulcrum of the lever to a tapped part or clevis $m$, whereon a stiff spring $n$ is mounted to oppose the normal inward pull of the armature. Coöperating with the tapped part or clevis is a threaded rod o, extending between two of the field-magnets and terminating in a hand-wheel p. This comprises the preferred means for effecting the axial withdrawal of the armature from its normal position within the field structure in order to increase the speed of rotation. By merely turning the hand-wheel in the direction to inwardly draw the upper end of the rocker-arm or lever it is apparent that the armature must be axially moved toward the left, Fig. II, out of its normal or low-speed position of rotation within the field structure. Upon the resulting increase of speed, however, particularly under heavy loads, it has been found that very serious sparking at the brushes results in this type of motor, and I have sought to provide means whereby all sparking will be avoided and at the same time overcome the tendency of the armature to slow down or fall away in speed under full load. These results I have accomplished by providing a separate laterally-positioned magnetic system or systems found in the magnets q, disposed at either side of the motor between two of the field-poles. The windings r thereof are connected in series with the armature, as shown in Fig. VII, and by this arrangement in consequence I am enabled to operate the motor equally well in either direction of rotation, since the reversal of current through the armature necessarily reverses the polarity of the magnets q. The commutating field-poles of these magnets, it will be understood, are positioned opposite to those coils of the armature which are undergoing commutation, the armature being in any of its positions of withdrawal. These coils, accordingly, are magnetically influenced for this brief period in a manner to oppose the current previously flowing through said coils, and thus avoid sparking during the operation of the armature in its high-speed positions.

A modified type of electromagnet for providing a commutating-field is shown in Fig. V, wherein the windings r are disposed upon an iron core s, formed with lateral extensions t to subtend the quadrant of a circle and lie between but beyond the adjacent poles of the field structure. The coils of the armature when axially drawn beneath the extensions t will be subjected to their magnetism at the moment of commutation and sparking will be avoided, it being understood that two of the modified type of magnets are used. If one alone is employed upon the motor, the flux therefrom must be twice as strong as before, and the armature of series-connected type would then preferably be provided with two brushes only. I will explain this and other features of operation more in detail, however, by making reference to the preferred electromagnet structure for embodying my invention disclosed in the other figures of the drawings and particularly in Figs. III and IV.

In the structure of Fig. III E-shaped laminated plates are suitably riveted together to form a magnet q, having three limbs. A lateral extension v preferably is provided for carrying the magnetic lines over a greater area than is covered by the laminated plates. Upon these poles the winding r is disposed, as before; but in order to provide against the normal speed drop said coil r is subdivided, the central limb of the magnet carrying the main portion thereof, (designated as winding w,) which serves to supply the commutating-field for the motor, while windings x and y, respectively, wound to excite similar and opposite polarity in their cores, will generate the field of force serving to counteract the speed drop. Obviously these functions are entirely separate, and either set of windings may be employed independently to effect their particular functions in the improved motor.

In the diagram of Fig. III, I have designated the polarity of the several parts of the main and secondary magnetic systems by the characters N' and S', and it is to be assumed that the armature in Fig. III is rotating in a contra-clockwise direction.

With the structural features in mind the mode of operation will now be readily appreciated. In order to increase the speed of the armature, the fields being under the influence of a given constant current, it is necessary only to axially withdraw the armature from the field structure, thus increasing the reluctance of the air-gap between the armature and field, and consequently decreasing the magnetic flux entering the armature from the main field structure.

Since the counter electromotive force of an armature is proportional to the product of the speed and the magnetic flux and such product is practically constant for a given primary electromotive force, such decrease in the magnetic flux must be accompanied by an increase in speed, which necessarily takes place. The withdrawal of the armature from the magnetic field reduces the area of the air-gap, and thus effects an increase in the reluctance thereof. This is true whether or not the interior armature-receiving space and coacting armature be of ordinary cylindrical form; but by employing the frusto-conical construction for the armature and fields, as described, not only is the area of the air-gap decreased, but the length thereof is simultaneously increased with the withdrawal of the armature, thus further adding to the magnetic reluctance. As the armature is withdrawn, however, it is subjected over restricted areas to the magnetic lines of force generated by the secondary magnetic system or systems afforded by the laterally-extending and series-connected electromagnets, so that the armature-coils at the moment of commutation have generated therein a counter electromotive force in opposition to the current previously flowing therein, the one reversing the other to prevent sparking.

In Fig. III, N' represents one of the main fields and is assumed to be a north pole, and in consequence S' will be an adjacent main south pole.

The commutating-pole $z$ of the electromagnet is excited by the coil $w$. The flux from the main poles N' and S' is exactly the same as the flux in any ordinary four-pole motor. The flux from the commutating-pole $z$ normally divides. The two lines 1 1 indicate the normal division and direction of the flux from the commutating-pole. Half of it will flow to one limb of the return-circuit on the right-hand side of the center commutating-pole, and the other half will flow to the left-hand limb of the return-circuit.

It is clear that the flux $l\,l$ from the commutating-pole $z$ to the return-circuit is opposed by the magneto-motive force of the armature. The amount of this opposition will be proportional to the number of armature-conductors inclosed by the flux from the main pole $z$ or, referring to the diagram, to the number of armature-conductors embraced within the lines 1 1 and the circumference of the armature $d$.

It is clear that the strength of the main pole $z$ will be proportional to the current flowing through the coil $w$, and the commutating action thereof will be proportional to the amount of current to be commutated, since said coil is in series relation to the coils of the armature.

The function of the coils $x$ and $y$ is entirely independent of the function of the coil $w$. Coils $x$ and $y$ are provided only for the purpose of regulating the speed or of preventing the ordinary speed drop, which occurs as the motor is brought to full load.

It is clear that the speed is inversely proportional to the flux from the main poles N' and S'. Anything which decreases this net flux raises the speed. Conversely, anything that increases the net flux reduces the speed. The two poles excited, respectively, by coils $x$ and $y$ produce an auxiliary flux represented by the line 2 in opposition to the main flux between the poles N' and S'. The amount of this flux is proportional to the current traveling through the coils $x$ and $y$, and by providing the proper number of turns on the coils the speed can be perfectly controlled. If required, the speed can be made higher at full load than at no load. Actually, instead of being two separate and distinct fluxes, as indicated in the diagram, the main flux from the pole $z$ instead of dividing equally, as it would normally tend to do, returns unequally more of the flux returning through the right-hand pole than returns through the other pole. It is clear that the result as far as the speed drop is concerned will be the same whichever method of flux distribution is assumed.

From a consideration of the foregoing it will be appreciated that the secondary magnetic system or systems in motors of this type may comprise one or more of the electromagnets herein set forth and that the windings $r$ may be disposed either to provide the commutating-field referred to or to serve as a speed-drop corrective, or both functions may be accomplished thereby with the preferred type of electromagnet, since it is obvious that the windings may be omitted either from the outer or inner limbs of said magnet. Preferably two of such magnets oppositely or diametrically positioned are employed in a four-pole motor, although one alone or more magnets may be used with proper proportioning of the windings.

The active portion of the winding $r$, as the winding $w$, Fig. III, should be supplied with sufficient turns so that at any load the flux from the pole into the armature is sufficient to produce sparkless commutation, which result is materially augmented by the series connection of the winding with the armature. The proportioning of the coils, however, may be mathematically calculated by those skilled in the art. It may be observed as a general statement that the windings $w$ will usually have approximately ten times the number of turns that are provided for windings $x$ and $y$.

By reason of the structural features presented by the preferred type of electromagnet, having the three limbs for affording readily-closed paths for the lines of magnetic force generated by the commutating-pole $z$, said magnet is better adapted for the purpose herein set forth than any other form with which I am acquainted, although I do not desire to be understood as necessarily restricting my invention to the precise structural features above specified and shown in the drawings, and accordingly I claim said invention, together with such modifications as may be made by those skilled in the art, as follows:

1. In a dynamo-electric machine, the combination with its field structure, of a laterally-positioned magnetic system beyond the fields, means for exciting the same, comprising windings thereon in series circuit with the armature of the motor, an armature mounted normally to rotate beneath the fields, and suitable mechanism for effecting the relative lateral movement of the armature and field structure, adapted to increase the speed of rotation and simultaneously subject the armature to the excited magnetic system, substantially as set forth.

2. In a variable-speed electric motor, the combination with the field structure thereof, of an armature normally rotating within said field structure, suitable mechanism for effecting the relative lateral movement of the armature and field structure, whereby the speed of the motor is controlled, and means for creating a commutating-field for the armature in its positions of withdrawal from the field structure, comprising a magnetic core positioned beyond the field structure closely adjacent to the armature when withdrawn therefrom, and exciting-windings upon said core adapted to produce a magnetic field for the armature-coils at the moment of commutation, substantially as set forth.

3. In a variable-speed electric motor of the general class described, the combination with its field structure, of an armature mounted normally to rotate therein, means for effecting the partial axial withdrawal of the armature from its field structure to increase its speed of rotation, and a separate magnetic system laterally positioned to subject the armature-coils to a field at the moment of commutation; said magnetic system being excited by windings in series relation with the armature, substantially as set forth.

4. In a variable-speed electric motor of the general class described, the combination with its field structure, of an armature mounted normally to rotate therein, means for effecting the partial axial withdrawal of the armature from its field structure to increase its speed of rotation, and a separate magnetic system suitably excited to subject the coils of the armature to lines of magnetic force in opposition to those generated by the field structure, whereby the normal speed drop of the motor is corrected, substantially as set forth.

5. In a variable-speed electric motor of the general class described, the combination with its field structure, of an armature mounted normally to rotate therein, means for effecting the partial axial withdrawal of the armature from its field structure to increase its speed of rotation, and separate magnetic systems laterally positioned beyond the field structure comprising a pole piece or core suitably excited to present a polarity similar to that of the rearwardly and laterally adjacent pole of the field structure and a second pole piece or core suitably excited to subject the armature-coils to lines of force in opposition to those generated by the field structure, whereby a commutating-field is produced and the speed drop is corrected, respectively, substantially as set forth.

6. In a variable-speed electric motor of the class described, the combination with its field structure, of two laterally-positioned electromagnets having exciting-windings thereon in series relation with the armature; the same affording commutating-fields, an armature normally rotating within the field structure, and means for partially withdrawing the armature from said field structure into positions of adjustment beneath the commutating-fields, substantially as set forth.

7. In a variable-speed electric motor of the class described, the combination with its field structure, of laterally-positioned electromagnets having a plurality of windings upon the respective limbs thereof in series relation with the armature; said windings being adapted respectively to supply a commutating-field and to subject the coils of the armature to lines of magnetic force in opposition to those generated by the field structure, an armature normally rotating within the field structure, and suitable mechanism for partially withdrawing the armature from said field structure into positions of adjustment beneath the electromagnets, substantially as set forth.

8. In a variable-speed electric motor of the class described, the combination with its field structure, of an armature mounted normally to rotate therein, means for effecting the partial withdrawal of the armature axially from said field structure, and a heavy spring associated therewith adapted to counterbalance the inward pull of the armature during the period of its withdrawal, substantially as set forth.

9. In a variable-speed electric motor of the class described, the combination with its field structure, of an armature mounted normally to rotate therein, and means for effecting the partial axial withdrawal of the armature from said field structure, comprising a rocker-arm or lever, and screw mechanism associated therewith adapted to actuate said rocker-arm or lever and withdraw the armature from the field structure to effect an increase in speed, substantially as set forth.

10. In a variable-speed electric motor of the type herein set forth, the combination with its field structure, of an armature mounted normally to rotate therein, a rocker-arm or lever connected therewith, a spring opposing the movement of the rocker-arm and armature, and screw mechanism associated therewith for actuating the rocker-arm to withdraw the armature axially from its normal position of rotation within the field structure, substantially as set forth.

11. In a variable-speed electric motor of the type herein set forth, the combination with its field structure, of an armature mounted normally to rotate therein, a sliding bearing for the armature, a supporting frame or spider for said bearing, a rocker-arm or lever associated therewith, a spring opposing the movement of said rocker-arm, and screw mechanism positioned within the motor-frame adapted to actuate the rocker-arm and the armature-bearing, whereby said armature is axially withdrawn from its normal position of rotation within the field structure, substantially as set forth.

12. In a variable-speed electric motor of the type herein set forth, the combination with its field structure, of an armature mounted normally to rotate therein, means for effecting the partial withdrawal of the armature axially from said field structure, comprising a connecting rocker-arm or lever, a counterbalancing-spring, and screw mechanism associated therewith for moving the armature, and additional means for treating a commutating magnetic field for the armature in its positions of withdrawal, substantially as set forth.

Signed at Cleveland, this 9th day of January, A. D. 1906, in the presence of the undersigned witnesses.

JOHN C. LINCOLN.

Witnesses:
FRANK H. FORREST,
ALBERT LYON LAWRENCE.